Patented July 2, 1935

2,006,699

UNITED STATES PATENT OFFICE 2,006,699

PROCESS OF MAKING VITAMIN-CONTAINING MATERIAL

George C. Supplee and George E. Flanigan, Bainbridge, N. Y., assignors to The Borden Company, New York, N. Y., a corporation of New Jersey No Drawing. Application December 16, 1930, Serial No. 502,853

13 Claims. (Cl. 99—11)

Our present invention relates to the production of a material rich in vitamins from the processes of recovering the primary constituents of whole milk.

As is well known, whole milk contains a considerable number of materials, notably butter fat, casein, lactalbumen and lactose, as the major constituents other than water, and the milk also contains certain valuable vitamins. It also contains salts and a number of other water soluble substances which are not very well known and which have not been thoroughly studied. These latter will be referred to hereinafter as "unclassified substances".

In the present invention we aim to produce a material containing a large proportion of certain of the vitamins normally present in milk, as a by-product, while recovering the fat, casein and milk sugar as primary products, and while departing as little as possible from the recognized method.

The process is applicable to whole milk and also skim milk, and it would also be applicable to whey, under certain conditions as indicated below.

The butter fat can be separated from the serum in any suitable manner, for example this can be separated in the form of cream by settling or centrifugal treatment. The casein can be separated either from whole milk or skim milk, by the action of acid or rennet, and if certain kinds of cheese are desired there may be more or less fermentation in the milk before or during the manufacture of the cheese. With some methods of removing the casein, it is very advisable to conduct the coagulation or precipitation of the casein under such conditions that the casein does not absorb or retain any large proportion of the water-soluble vitamins in the milk or skim milk. The acidity is then adjusted to somewhat below 6.9 pH, for example by milk of lime it being advisable to bring the pH to above 5.2 or 5.3 and below 6.9.

The lactalbumen can then be precipitated by heating, and this may be filtered off or not as desired. The whey from which the lactalbumen has been largely or entirely precipitated or coagulated can be concentrated in vacuum, nearly to the state of causing crystallization and separation of lactose.

The lactalbumen should of course be separated prior to the crystallization of the lactose. Then by a series of concentrations and crystallizations, the major part of the lactose, and preferably nearly all of the lactose is crystallized out, together with some of the other constituents including a part of the mineral salts, and some of the unclassified constituents.

The remaining liquid material is a concentrate rich in water-soluble vitamins and the vitamins can be further concentrated or isolated if desired.

As intimated above, processes for separation of butter fat in the form of cream, casein as such or in the form of cheese, lactalbumen, and lactose or milk sugar are well known and these processes, with certain modifications as indicated below are utilized in the present invention, a by-product of such process being the primary or final vitamin material in the present invention.

It is already well known that vitamins "A" and "D" occur in milk largely associated with the butter fat, and these will normally be taken out along with the cream or other products (such as cheese of certain sorts) containing the bulk of the butter fat of the milk.

It has also been heretofore shown that milk contains vitamins "B", "C" and "G", and the present invention aims to get as large a proportion as possible of these, particularly the latter, into the final product which is a by-product of the production of fat, casein and milk sugar.

It can be shown that the proteins of milk, casein and albumen, with the minerals of milk, the water, lactose and fat when separated in pure form and their specific nutritive properties studied, these substances do not carry in themselves any (or at least any considerable) vitamin "B" and "G" potency. Therefore it is a fact that the vitamin B and vitamin G contents of milk are largely associated with constituents of the milk other than the entities above mentioned. As a further concrete illustration, if an animal under test, were fed only a synthesized milk containing the fat of the milk, the minerals, lactose and proteins, casein and albumen, all as pure substances, that animal would fail to grow and death would soon ensue because the natural milk vitamins have been excluded in the purified substances used for the synthesized die just mentioned.

Although milk when used in toto is not generally recognized as having an exceptionally high vitamin "B" and "G" value, the fact that it has been proven to contain at least some of these vitamins presents the possibility that these vitamins can be segregated and concentrated independently of the other non-vitamin constituents of milk. This achievement is in substance the essence of our invention. It has been stated above that the gross constitutents as mentioned, when in a pure state have been proven to be devoid of vitamins "B" and "G". Therefore our invention has to do with the preparation of a concentrate of the substances which contain the vitamins in question in active form and with a degree of potency much greater than found in the bulk of the natural milk or in any of the other constituents thereof.

The preparation of the vitamin concentrate is accomplished by the more or less successive removal from whole milk of the fat, the casein, the albumen and certain of the readily precipitatable minerals and a very substantial proportion of the sugar. Or, starting with skim milk we remove the casein, albumen, salts and sugar. The various steps of the process having been carried out in a manner which yields as a final product a substance devoid of fat, casein, and natural milk albumen, but which may (and usually will) retain a certain proportion of the natural water-soluble minerals of milk and a certain proportion of the milk sugar maintained in equilibrium with these minerals and other water soluble substances previously mentioned associated with the water-soluble vitamins "B" and "G". The product as prepared by our methods therefore contains only as inert material (inert being used in the sense of having no vitamin potency), a mineral content derived from the natural milk minerals but in a higher percentage than normally found in milk, a certain percentage of milk sugar, and a concentration of unidentified chemical entities normally found in dilute condition in milk, and with which is associated in highly potent form vitamins "B" and "G" (water-soluble growth-promoting factors), and possibly certain other entities of specific nutritive value which have not yet been fully demonstrated. By making specific reference to these two vitamins, we do not intend to positively affirm that no others are present.

As an example of the manner in which this product may be prepared we shall start with any given volume of natural fluid milk. Milk containing its normal fat content may be used as the starting point or skim milk from which all or part of the fat has been removed by any practicable means (centrifugal treatment or settling or skimming) may be used. In either case, the casein is precipitated under conditions which permit the retention in the serum or whey of the maximum amount of the water soluble vitamins which it is desired to retain in the final product. For illustration we have found that the presence of ionized salts in suitable concentration as for example sodium or potassium chloride, facilitate the separation of the water soluble vitamins from the casein.

Thus the casein might be precipitated with rennet alone and if skim milk be used for the preparation of a particular type of rennet casein, 10 pounds of rennet extract per 13,000 pounds of milk would yield a serum of marked potency if such serum were carried through to completion in an otherwise satisfactory manner. If rennet were to be added to whole milk as a precipitant as in the case of cheese manufacture presumably less would be added and the amount and exact conditions of its addition would depend to some extent upon the type of cheese being prepared. Likewise, if acid and rennet were used, small amounts of commercial lactic acid might be added, or the acidity of milk might be allowed to develop to the proper degree by bacterial action in the milk itself without acid extraneously added. If acid alone were used as a precipitant as in the preparation of various types of casein from skim milk, hydrochloric acid of commercial grade and 1.19 specific gravity could be added at different levels, depending upon the degree of heat which it was desired to apply in advancing the coagulation point. Thus one pound of such acid per 1000 to 1200 pounds of milk at a temperature of 120° F., could be used. However, we would make it entirely clear that variations in this particular are permissible and we do not confine ourselves to exact conditions which may be followed in order to give a final vitamin concentrate of satisfactory potency. In general we find that the acidity expressed in terms of pH value, is in the neighborhood of 4.5 to 4.7. Other acids could be used, such as sulfuric acid, lactic acid, acetic acid, etc. for example. In general it is to be observed that the coagulation of the milk should be so regulated that the absorptive area of the casein as well as its susceptibility for absorption and/or adsorption of the vitamin in question should be reduced to a minimum. Our experimental work has revealed that these factors are important in determining the absolute vitamin value of the final product. The relationship necessary to give the optimum results will vary between considerable limits. In some instances it may be desirable in order to create the proper physical condition of the casein which will minimize its adsorptive properties toward the particular vitamins in question to add certain salts (such as the chlorides of sodium, potassium and calcium and/or sodium or potassium dihydrogen phosphate) to the milk before precipitation of the casein or after the precipitation has actually taken place. The degree of temperature and acidity or pH value of the mass containing the coagulated or precipitated casein, and the degree or character of the coalesced casein particles which may affect leaching of the water soluble vitamins from such masses, are matters of some importance in determining conditions which permit the retention of the water soluble vitamins in the whey or serum and thereby determining within certain limits the vitamin potency of the final product. A pH value of about 4.5 to 4.7, at this stage, is satisfactory. The object of the precautions and conditions attending the initial precipitation of the casein is to provide for the minimum retention of the water soluble vitamins by the casein or other precipitated materials and to allow for the maximum concentration of the desired substances to remain in the liquid whey or serum. It has been ascertained that casein precipitated from natural milk by some methods has adsorbed with it substantial quantities of the water soluble vitamins particularly vitamin "G", and a biological assay of various commercial caseins or even caseins which have been subsequently treated in a uniform manner for the purpose of freeing them from vitamin "G", have nevertheless shown that the casein had adsorbed and retained this vitamin with great tenacity. Our experiments have revealed that this variation in degree of adsorbed vitamin "G" found associated with caseins is determined to a substantial degree by the manner in which the precipitation is carried out. One of the objects of our invention is to carry out this initial precipitation of the casein in a manner which allows only minimum adsorption or retention of the vitamin by the casein. But we do not restrict the invention to the details as given.

After precipitation of the casein as above described the whey or serum containing substantially all of the water soluble vitamins under consideration, is drawn from the casein and quickly heated after determination and adjustment of the pH value. At this stage of the operation it has been determined that the pH value may vary within relatively wide limits on the acid side of neutrality without material detriment to the conduct of the process or to the final product. However, the pH value as determined at this point should be preferably above 4.5 and not over 6.9 to 7.0. At this point of the operation it is preferred to adjust the acidity or pH value prior to or before completion of the heating period, to a definite acidity or pH value between 5.2 or 5.3 and which shall not exceed about 6.9. This adjustment of the pH value may be accomplished by a suitable neutralizer such as milk of lime. The heating should be carried to at least 180° F., and preferably to between this and the boiling point. Under the conditions of treatment as described a very large percentage of the lactalbumen will become flocculated and in a readily filtrable condition. Filtration of the precipitated albumen at this point however need not necessarily be done. As long as the albumen has become precipitated or flocculated in the manner described it is immaterial whether the serum is now concentrated in the presence of the coagulated albumen or whether the albumen is filtered off. In practice however, the preferred method is to filter out the precipitated albumen or decant the clear liquid and proceed with the next step. It has been ascertained that the flocculation of the albumen under conditions as described simultaneously removes certain of the natural milk minerals through adsorption by the colloidal character of the albumen or by reactions existing in the mass or both.

The whey or serum, with or without precipitated albumen is now concentrated in a suitable evaporator under reduced pressure. It is immaterial whether this evaporation is carried through to the final desired degree of concentration in one step or whether the concentration is carried to a given degree and at such a point at which the albumen or precipitated material is filtered off and the serum subsequently evaporated to the final desired degree. The practice followed in this respect will to a certain extent be dependent upon whether the albumen is removed before the evaporation process starts. At any rate the concentration of the serum is conducted in a manner which permits the growth of crystals of milk sugar of suitable size and character, from which other soluble substances may be readily removed by draining or centrifuging. While the details of the manipulations desired to create such a condition in the crystallizing mass are only an integral part in conducting the preferred method of operation, attention is centered to this feature primarily for the purpose of showing that in order to obtain the highest potency in the final product, conditions must be maintained throughout which will eliminate undue adsorption or mechanical loss of the potent material by adsorption or mechanical cohesion to the inert material.

As a matter of further explanation in regard to the concentrating process for the convenient crystallization of the lactose, our preferred method of operation is to filter out the coagulated or flocculated lactalbumen before concentration has reached a point which permits any crystallization of the lactose whatsoever. In order that this filtration may be facilitated and the minimum of the water soluble vitamins retained as adsorbed material by the filter cake it is desired that the solution be maintained substantially on the acid side of neutrality (pH 5.3 to 6.9) but not so low as to permit resolution of the precipitated protein. In certain cases it may be desirable to add to the mixture an inorganic porous material, e. g. clay, filter-cel (diatomaceous earth) etc., to aid filtering and prevent excessive adsorption of the vitamins. Such inorganic materials which are known to have particular affinity for the adsorption of these materials such as highly adsorbent fuller's earth, "Norit" (activated decolorizing carbon, etc.) should not be used at this stage in the sequence of steps to be followed in the particular procedure now under consideration.

It is to be noted that the process as described thus far provides for removal of the precipitated proteins, casein and albumen and tests at this stage have shown that the casein has been removed to the extend of 100 per cent or substantially so and that the albumen has been removed to substantially the same degree. There has however been little or no removal of the soluble vitamins or unclassified organic nitrogenous water soluble compounds.

The first concentration and crystallization process carried out as described will permit the removal of roughly according to typical experiences 70 per cent of the milk sugar originally in the fluid milk. To obtain this result the whey or serum is concentrated to about 38 to 40° Bé., or to the total solids content in the neighborhood of 70 to 75%. This concentration is carried out preferably in a vacuum pan at a vacuum varying from 26 to 29 inches and at corresponding temperature which would be approximately 125 to 135 degrees F.

The crystallized lactose may be removed from the remaining solution of water soluble constituents by any desired and practicable means which will permit substantially complete separation of the liquid portion (which contains the desired vitamins).

After the removal of the lactose from the first crystallization the solution now contains a higher concentration of water soluble milk minerals, vitamins "B" and "G" and unclassified water soluble milk constituents, lactose excepted, than at any earlier point in the process. This solution is now concentrated at a low temperature under reduced pressure (under conditions like those in the second paragraph above) to a point which permits further crystallization of the lactose and certain of the less soluble salts of the mixture. In the preferred execution of this part of the process it is desirable to regulate the conditions of concentration and crystallization so that relatively large and well formed crystals will be produced with the minimum of interstices in which the remaining water soluble residue may collect and thereby be difficult to separate from such crystals. While the execution of the process is not dependent upon a closely stipulated description for the control of the lactose crystallization at this point, it is obvious that the vitamin potency of the final product will be determined by the degree with which this manipulation is conducted.

For subsequent crystallizations (after the first) it is preferred that the concentration not be carried to such a degree in the vacuum pan that crystals are started at the particular concentrating temperature. It is preferable to draw the material from the vacuum pan before any crystals have formed and allow the mass to slowly cool to the lower temperature, i. e. to room temperature in order that growth of relatively large crystals may be induced rather than having in the mass numerous small crystals which would result by too rapid or too low cooling of this concentrate. In general such temperature, relatively high as contrasted with the first crystallization, and relatively long periods of time should be employed in all crystallizations subsequent to the first one in which approximately 70% of the milk sugar is removed. On the second crystallization from 40 to 50% of the remaining sugar, or roughly 10 to 15% of the total sugar originally present is removed. In the next crystallization approximately 40 to 45% of the second remainder may be crystallized out, or approximately 5 to 6% of the sugar computed to the original basis. Our data now available indicate that considerably above 90, and possibly above 95% of the original total sugar can be crystallized out.

As subsequent crystallizations are carried out there appear as crystallized material not only the proportions of lactose as indicated above, but also increasing proportions of mineral matter. The chlorides of potassium and sodium have been identified as being removed during these subsequent crystallizations. The potassium chloride comes out first and in relatively large proportions as compared with the sodium chloride. The following analysis of a residue from a last crystallization step, shows the following results computed to the dry basis. Lactose 30.53%; ash 32.31%; nitrogen 4.11. The nitrogen computed as protein would be 26.22%; this protein however, is neither present in the form of casein nor albumen. The percentage of the above constituents in skim milk computed to the dry basis may be considered substantially as follows: fat 1.37%; protein (largely casein and albumen) 35.01%; lactose 51.74% and ash 8.19%.

Experiments have shown that as subsequent concentrations of the remaining liquid are carried out the character of the crystallized material shows an increasingly higher proportion of the inorganic salts with a corresponding decrease in lactose. The liquid portion, as a result of each subsequent crystallization becomes more concentrated in the vitamin factors and in some of the other unclassified water soluble substances.

It is the fluid part or residue resulting from a sequence of crystallizations the execution and character of which has been described that we claim as a product of this invention and the process of its preparation.

Tests made in reference to this process and the product resulting therefrom have shown that the product yielded by such process contains a water soluble vitamin content, particularly vitamin "G", the growth promoting or possibly antipellagric vitamin which is from 50 to 140 times more potent than the natural milk from which it was prepared. Stating this evaluation in another way, one pound of the vitamin concentrate prepared by this method would contain as much vitamin "G" or the growth promoting vitamin of milk as 50 to 140 pounds of fluid milk.

The exact relative potency of the product obtained by the process already described will depend upon the care in conducting the various manipulations and to a material extent upon the number of subsequent crystallizations carried out for the removal of lactose and inorganic salts. Experiments have shown that substantially no amount of the potent material is adsorbed by the crystallized lactose and salts whereas substantial quantities may be adsorbed by the protein constituents casein and albumen unless the precautions previously mentioned are carefully adhered to.

If a further degree of concentration of the vitamin content is desired other manipulations designed to free the concentrated product yielded by the process explained thus far, may be used. Such steps however are of somewhat different character than those already described. For illustration certain precipitants may be used which have the specific properties of removing inert nitrogenous matter leaving the vitamin concentrate in the fluid residue; or, the reverse of this relationship may be attained by using other types of precipitants which have a particular affinity for flocculating nitrogenous materials in a manner which permits the adsorption thereon of substantial quantities of the active vitamins; or the residue as obtained in the process described above may be further concentrated to actual dryness under conditions which do not destroy the potency of the vitamins in question, thereby further increasing the vitamin potency per unit of weight or volume; the concentrated material may be treated with substances which have the peculiar affinity for adsorbing high concentrations of the vitamin on their surfaces. Such substances may be added to the fluid residue and the material thus adsorbed released from the adsorbing substance under conditions which permit retention of the vitamin potency in the released material, or in certain instances, depending upon the character of the material this adsorbed vitamin may remain with the adsorbing material and this mass considered as the vitamin concentrate; or such substances may be added for the purpose of adsorbing the vitamins at even earlier stages of the process, but particularly and preferably after the casein and albumen have been removed as described above.

It is known to us that the residue from the general process as shown by the foregoing analysis can upon re-diluting with water be treated with certain precipitants such as lead salts, phosphotungstic acid, colloidal iron and others, and, with the particular precipitant used and the conditions under which it is used, with reference to acidity or pH value, will result in certain instances in occluding the vitamin on the precipitated material and for others relatively less of the vitamin would be occluded and consequently remain in the filtrate. For example alcohol might be mentioned as an example wherein the percentage of alcohol, determines whether it acts as a precipitant or as a solvent. These relative facts we have studied and are under process of development now.

Regarding drying of the liquid concentrate, the residue may be dried to a point containing substantially no water and may then be taken at any convenient point, such point depending upon the degree of purity of the vitamins which it is desired to reduce to dry form. This drying may be conducted in a vacuum shelf dryer or in a tunnel dryer. According to our present developments it cannot be dried on the atmospheric drum dryers. The amount of dry material which would be obtained from any given fluid residue would depend upon the point at which such residue was selected for further desiccation. We have thus obtained, and experimented with, potent solid residues which vary from 1/50 to 1/150 of the weight of original milk, yielding the amount under consideration. Further concentrations we know are possible.

It is to be understood that the essence of our invention lies primarily in the recovery and concentration of the water soluble vitamins of milk, vitamins "B" and "G", particularly the latter, in a manner which retains to a high degree the natural potency or nutritive and medicinal properties of these vitamins as found in the original milk, and further that such vitamin concentrate is totally or substantially devoid of milk fat, casein and natural lactalbumen, and further that it may contain a proportion of lactose and natural milk salts which however are relatively different in their relationship than found in fluid milk, and also that the product is characterized particularly by a degree of concentration of unclassified nitrogenous natural milk substances and water soluble vitamins not now known to exist in other milk products or derivatives thereof found in commerce.

While we have mentioned specifically the co-ordinated steps of a process for the production of this product we wish it to be understood that we do not limit ourselves to the particular illustrations mentioned above as others than those cited might be used for the removal of inactive materials.

While our present application covers primarily the production of a vitamin product, it is to be understood that our procedure also yields as secondary products other substances which may be of commercial significance and of economical importance as viewed from the standpoint of extending the utilization of milk by-products. For illustration it is indicated quite definitely that by giving particular attention to the further treatment of secondary products from this concentrate, we can prepare a group of lecithins or phospho-lipins, and other by-products.

We claim:—

1. In the treatment of milk, the herein method which comprises precipitating casein by means of an acid, while in the presence of an amount of added ionized salt in excess of that normally present in milk, whereby the amount of vitamins held by the casein is substantially reduced, thereby increasing the vitamin content in the resulting liquid product, the pH value of the liquid throughout the process being kept between about 4.5 and about 6.9, whereby the vitamins are not destroyed.

2. In the treatment of milk, the herein described method which comprises precipitating casein by means of an acid while in the presence of an amount of added ionized salt in excess of that normally present in milk, whereby the amount of vitamins held by the precipitated casein is substantially reduced, the pH value of the liquid throughout the process being kept below about 6.9.

3. A process for recovering the B and G vitamins from milk, comprising substantially completely separating the B and G vitamins from the casein in the milk by precipitating the casein from the milk at a pH of substantially 4.5 to 4.7 and under such conditions that the adsorptive property of the casein is reduced to a minimum, substantially completely separating the B and G vitamins from the albumin in the milk by coagulating the albumin by decreasing the acidity of the solution but maintaining the pH below 7 and heating the solution, separating lactose from the water fraction by concentrating under reduced pressure and at relatively low temperature and crystallizing so as to produce large crystals, and separating the mother liquor from the crystals.

4. A process as described in claim 3 in which the lactose is separated by concentrating the water fraction having an initial pH value only slightly below 7.

5. A process as defined in claim 3 in which the lactose is separated from the water fraction by a plurality of concentrating and crystallizing steps, each succeeding crystallization being carried out more slowly than the preceding one.

6. A process as described in claim 12 in which the B and G vitamins are separated from the casein in the presence of a highly ionized added salt.

7. A process as defined in claim 3 in which the albumin is coagulated at a pH of about 5.2 to 6.9.

8. A process as described in claim 3 in which the albumin is coagulated at a pH of about 5.2 to 6.9 and at a temperature above 180° F.

9. A process as defined in claim 3 in which the coagulated albumin is separated before the solution is sufficiently concentrated to cause substantial crystallization of lactose.

10. A process as defined in claim 3 in which the lactose is separated by concentrating the solution until lactose crystallizes out, separating the lactose crystals, further concentrating the liquid, arresting such further concentration before further crystallization of lactose and slowly cooling the solution to separate lactose crystals.

11. A process as described in claim 3 in which the lactose is separated by concentrating to a concentration of 38 to 40° Bé. and the crystals are separated, after which the liquid is further concentrated, and subsequently cooling to separate further crystals.

12. A process as described in claim 3 in which the lactose is separated by concentrating at a temperature of about 125 to 135° F.

13. A process as defined in claim 3 in which the mother liquor from the separation of lactose is finally evaporated to dryness.

GEORGE C. SUPPLEE.
GEORGE E. FLANIGAN.

CERTIFICATE OF CORRECTION.

Patent No. 2,006,699.                          July 2, 1935.

GEORGE C. SUPPLEE, ET AL.

It is hereby certified that error appears in the printed specification of the above numbered patent requiring correction as follows: Page 1, second column, line 45, for "die" read diet; and page 5, second column, line 27, claim 6, for "12" read 3; and that the said Letters Patent should be read with these corrections therein that the same may conform to the record of the case in the Patent Office.

Signed and sealed this 8th day of October, A. D. 1935.

(Seal)

Leslie Frazer
Acting Commissioner of Patents.